May 4, 1926.

E. SCHNEIDER

BEARING

Filed Sept. 19, 1923   2 Sheets-Sheet 1

1,582,935

Patented May 4, 1926.

1,582,935

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY.

BEARING.

Application filed September 19, 1923. Serial No. 663,660.

*To all whom it may concern:*

Be it known that I, EUGÈNE SCHNEIDER, a citizen of the Republic of France, resident of Paris, France, have invented new and useful Improvements in Bearings, which is fully set forth in the following specification.

This invention relates to improvements in roller bearings of the type disclosed in my Patent No. 1,479,324, granted January 1, 1924.

In my aforesaid earlier patent there is described an improved roller bearing for the big end of the connecting rod on an internal crank-shaft for an internal combustion engine, wherein the inner roller races are constituted by the actual surface of the crank-shaft, whilst the outer roller races are formed by continuous rings (that is to say, rings that are not split diametrically) provided externally with retaining cheeks for the rollers, the internal diameter of said rings being made sufficiently great to allow of the cranks of the shaft passing therethrough.

The present invention has for its object to provide an improved constructional form of a roller bearing of that type.

In the accompanying drawings:—

Figure 1:
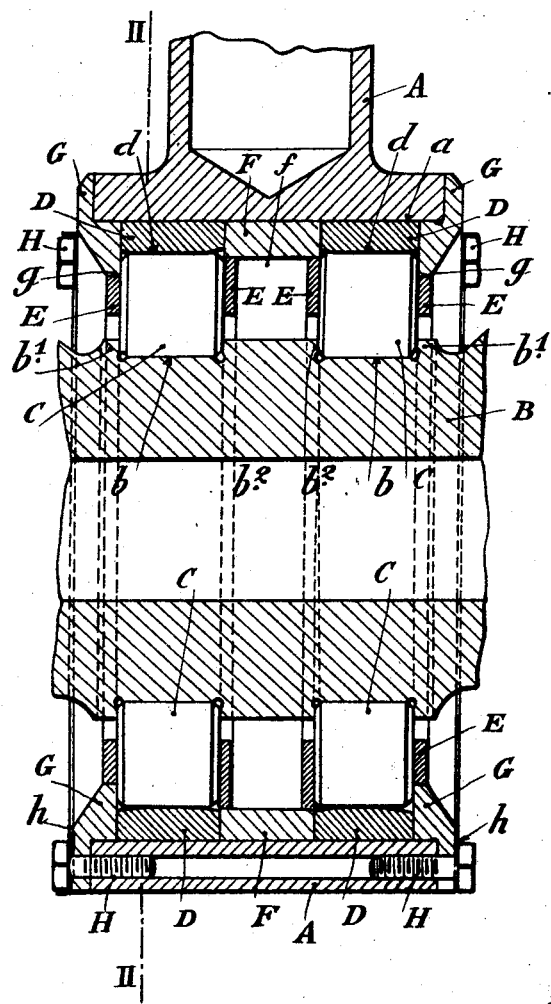
Figure 2:
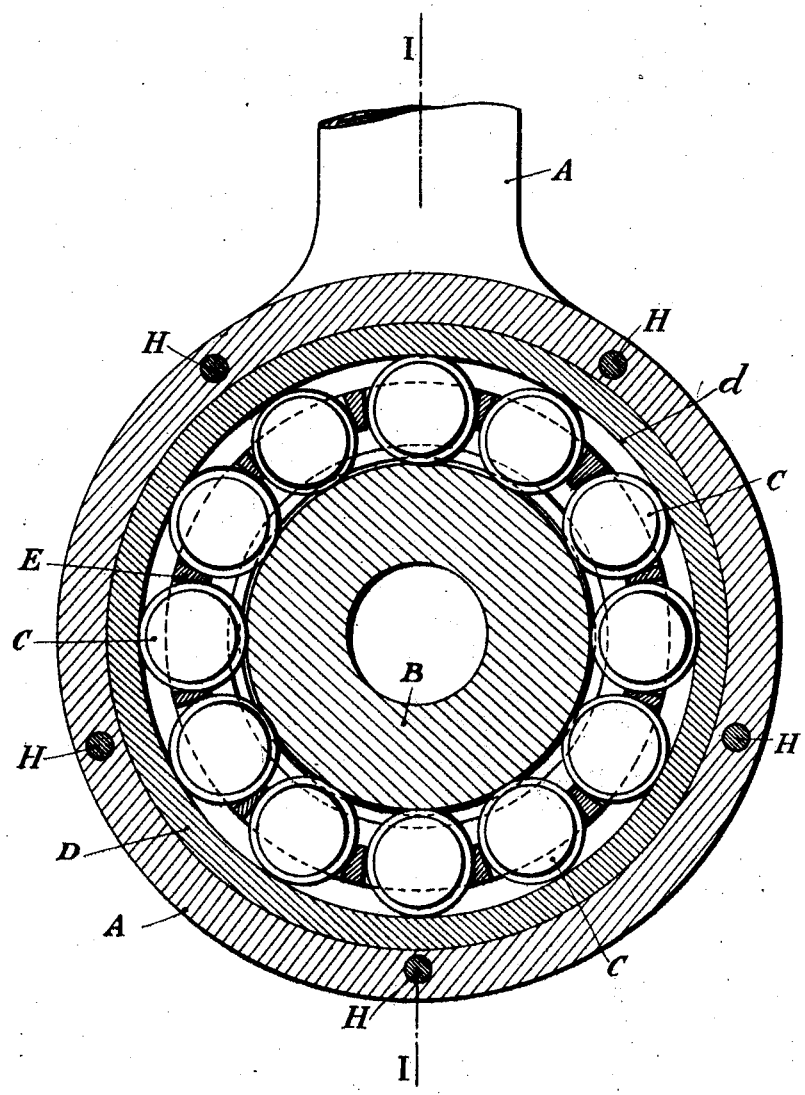

Figures 1 and 2 are sections taken respectively along the line I—I of Figure 2, and along the line II—II of Figure 1 of the improved bearing.

In these figures: A is the connecting rod and B is the crank-pin of the crank-shaft of an internal combustion engine. Two rows of rollers C roll directly on the inner roller races $b$ formed on the actual crank-pin, whereas the outer roller races $d$ are formed by the inner surfaces of continuous rings D fitted with slight friction in a cylindrical bore $a$ in the big end of the connecting rod. The rings D are prevented from having any end play in the inward direction by a spacing ring F, and in the outward direction by rings G that are fixed to the big end of the connecting rod and constitute retaining cheeks for the rollers.

The rollers are guided by shoulders $b^1$, $b^2$ of the crank-pin B. They are maintained at a suitable distance apart from one another by steel cages E made in one piece.

The improved roller bearing is assembled as follows:—

The two cages E are slipped into position over the cranks of the shaft, the internal diameter of these cages being made sufficiently large for this purpose.

The rollers C are placed into the recesses in the cages and are maintained temporarily in place by any suitable means, for instance by means of two half-cages that can be dismounted after the outer roller races D having been placed into position.

The connecting rod A is then mounted in place. Its internal diameter $a$ allows of its passing over the rows of rollers. Then a ring D, the spacing ring F, and the second ring D are mounted in succession. The assemblage is completed by the placing into position of two cheeks G which serve to retain the rings D and F in their places, and also act to prevent any sidewise displacement of the connecting rod A.

In order to prevent the effects of centrifugal force acting upon the cages E, the latter are fitted in the apertures $g$ of the cheeks G and in the interior $f$ of the spacing ring F. The bolts H that serve to fix the cheeks G to the connecting rod are locked by any suitable means such as sheet steel washers $h$ having their edges turned up against the heads of said bolts.

Having now particularly described and ascertained the nature of my said invention and in what manner the same is to be performed, I declare that what I claim is:—

1. In a roller bearing, the combination of a crank shaft provided with a pair of inner roller races, a connecting rod the big end of which encircles said inner races, a pair of rings in said big end providing outer roller races, cages between said races, rollers in said cages, a spacing ring between said race rings and engaging the peripheral surfaces of the cages at the inner ends thereof, a pair of retaining devices for the race rings engaging the peripheral surfaces of said cages at the outer ends thereof, and means securing said retaining devices in engagement with the race rings and the big end of said connecting rod.

2. In a roller bearing, the combination of a shaft, a hollow member encircling said shaft, a pair of race rings in said member, a pair of cages between the race rings and shaft, rollers in said cages engaging the shaft and race rings, a spacing ring between said race rings and engaging the peripheral surfaces of the cages at the inner ends thereof, a pair of retaining devices for said race rings, encircling the outer ends of said cages, and means securing said retaining devices in engagement with the race rings and said hollow member.

3. In a roller bearing, a shaft, a hollow member encircling the same, two series of rollers between said shaft and hollow member, two rings disposed within the hollow member and encircling the series of rollers, a spacing member between said rings, devices engaging the outer sides of the hollow member and extending within the same so as to engage said rings, and cages for said rollers retained in position by engagement with the inner surfaces of said devices and the spacing member.

4. In a roller bearing, a shaft, a hollow member encircling the same, a series of anti-friction rollers between said shaft and hollow member, a race ring encircling said anti-friction rollers, abutment members at the sides of said ring, and a cage for said rollers having its sides extended within said abutment members and engaging the inner surfaces thereof.

5. An anti-friction bearing comprising concentrically arranged inner and outer members adapted for relative rotation, a series of anti-friction devices between said members, a ring encircling said devices, abutments at the sides of said ring, and a cage for said anti-friction devices having its sides extended within said abutments and engaging the inner surfaces thereof.

6. An anti-friction bearing comprising concentrically arranged inner and outer members adapted for relative rotation, two series of anti-friction devices between said members, a pair of race rings encircling said devices, a spacing member between said rings, abutments for said rings at the outer sides thereof, and cages for said anti-friction devices, said cages extending within the spacing member and said abutments and engaging the inner surfaces thereof.

7. In combination, a shaft, annular shoulders formed on the shaft defining a bearing race, a hollow member encircling said shaft, a race ring in frictional engagement with the inner periphery of said hollow member, roller bearings between said race ring and the race formed on the shaft, cages for said rollers, and retaining devices secured to the sides of the said hollow member and extending within the same in abutting engagement with the sides of said race ring and outer periphery of the said cages, whereby independent movement of the said race ring and cages is limited.

8. In combination, a shaft, annular shoulders formed on the shaft defining a plurality of bearing races, a hollow member encircling said shaft, a plurality of spaced race rings in frictional engagement with the inner periphery of said hollow member, annular spacing means for maintaining said race rings in spaced relation, retaining devices secured to the sides of said hollow member and extending within the same in abutting engagement with the outer edges of said race rings, roller bearings between said race rings and said bearing races formed on the shaft, and cages for said roller bearings, the outer peripheries of said cages abutting the inner periphery of the said annular spacing means and of the inwardly extending portions of the retaining devices, whereby independent movement of the said cages is limited.

In testimony whereof I have signed this specification.

EUGÈNE SCHNEIDER.